United States Patent
Baker et al.

(10) Patent No.: US 8,019,180 B2
(45) Date of Patent: Sep. 13, 2011

(54) CONSTRUCTING ARBITRARY-PLANE AND MULTI-ARBITRARY-PLANE MOSAIC COMPOSITE IMAGES FROM A MULTI-IMAGER

(75) Inventors: Henry Harlyn Baker, Palo Alto, CA (US); Zeyu Li, Albany, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1322 days.

(21) Appl. No.: 11/591,432

(22) Filed: Oct. 31, 2006

(65) Prior Publication Data

US 2008/0101724 A1    May 1, 2008

(51) Int. Cl.
*G06K 9/32*    (2006.01)
(52) U.S. Cl. ..................... 382/294; 382/318
(58) Field of Classification Search .................... None
See application file for complete search history.

(56) References Cited

U.S. PATENT DOCUMENTS

| | | | |
|---|---|---|---|
| 5,963,664 A * | 10/1999 | Kumar et al. | 382/154 |
| 6,094,198 A * | 7/2000 | Shashua | 345/419 |
| 6,434,280 B1 * | 8/2002 | Peleg et al. | 382/299 |
| 6,608,923 B1 * | 8/2003 | Zhang et al. | 382/154 |
| 6,750,873 B1 * | 6/2004 | Bernardini et al. | 345/582 |
| 6,755,537 B1 * | 6/2004 | Raskar et al. | 353/94 |
| 6,870,563 B1 * | 3/2005 | Kang | 348/222.1 |
| 7,006,709 B2 * | 2/2006 | Kang et al. | 382/294 |
| 7,149,325 B2 * | 12/2006 | Pavlidis et al. | 382/103 |
| 7,307,654 B2 * | 12/2007 | Chang | 348/218.1 |
| 2002/0094135 A1 * | 7/2002 | Caspi et al. | 382/294 |
| 2003/0040815 A1 * | 2/2003 | Pavlidis | 700/48 |
| 2003/0053659 A1 * | 3/2003 | Pavlidis et al. | 382/103 |
| 2003/0086602 A1 * | 5/2003 | Trajkovic | 382/154 |
| 2003/0146922 A1 * | 8/2003 | Navab et al. | 345/633 |
| 2003/0190072 A1 * | 10/2003 | Adkins et al. | 382/154 |
| 2004/0071367 A1 * | 4/2004 | Irani et al. | 382/284 |
| 2004/0091171 A1 * | 5/2004 | Bone | 382/284 |
| 2005/0129325 A1 * | 6/2005 | Wu | 382/254 |
| 2006/0104541 A1 * | 5/2006 | Baker et al. | 382/284 |

OTHER PUBLICATIONS

High performance multi view reconstruction, Christopher et al. IEEE, 0-7695-2825-2, Jun. 14-16, 2006, pp. 113-120.*
High performance multiview reconstruction, Christopher et al. IEEE, 0-7695-2825-2, Jun. 14-16, 2006, pp. 113-120.*

* cited by examiner

*Primary Examiner* — Samir A Ahmed
*Assistant Examiner* — Jayesh Patel (57) ABSTRACT

A method for constructing arbitrary-plane and multi-arbitrary-plane mosaic composite images from a multi-imager is disclosed. A first homography set is generated for a multi-imager based on a first reference plane. A second homography set is then generated for the multi-imager based on a second reference plane, where the second reference plane is distinct from the first reference plane. The first homography set and the second homography set are then utilized to generate a third homography set for the multi-imager based on an arbitrary plane. In so doing, the arbitrary plane becomes repositionable with respect to a scene that the multi-imager is viewing. Multiple such arbitrary planes may be selected in constructing multi-planar mosaic composite images. Multiple such second reference planes may be presented to provide improved quality derivation of the said third homography set.

20 Claims, 13 Drawing Sheets

```
GENERATES A FIRST HOMOGRAPHY FOR A MULTI-IMAGER BASED
ON A FIRST REFERENCE PLANE.
402
```

↓

```
GENERATES A SECOND HOMOGRAPHY FOR SAID MULTI-IMAGER
BASED ON A SECOND REFERENCE PLANE, SAID SECOND
REFERENCE PLANE ADJOINING AND DISTINCT FROM SAID
FIRST REFERENCE PLANE.
404
```

↓

```
UTILIZES SAID FIRST HOMOGRAPHY AND SAID SECOND
HOMOGRAPHY TO GENERATE A THIRD HOMOGRAPHY FOR SAID
MULTI-IMAGER BASED ON AN ARBITRARY PLANE, SAID ARBITRARY
PLANE AUTOMATICALLY REPOSITIONABLE WITH RESPECT TO A
SCENE THAT SAID MULTI-IMAGER IS VIEWING.
406
```

CONSTRUCTING ARBITRARY-PLANE AND MULTI-ARBITRARY-PLANE MOSAIC COMPOSITE IMAGES FROM A MULTI-IMAGER

TECHNICAL FIELD

Embodiments of the present invention pertain to capturing non-planar scenes from a multi-imager.

BACKGROUND ART

Some conventional image acquisition systems have the capacity to combine individual images for the purpose of producing composite images that detail an enlarged field of view. These image acquisition systems use methodologies that rely upon the capture of the images by one or more cameras. In order to combine the images that are captured, some conventional systems rely on the overlap of image regions of the captured source images.

The quality of a composite image is constrained by the imagery that is used in its creation. It should be appreciated that the resolution involved and the number of viewpoints that are considered are important factors that impact the creation of composite images. The greater the resolution and number of viewpoints provided the greater the spatial resolution of the resultant composite image. While digital still cameras are reaching mega-pixel dimensions at nominal cost (e.g., providing increasingly high resolution images), the spatial resolution provided by digital video systems lags far behind that offered by digital still cameras.

The creation of composite images (e.g., mosaicking) involves combining source images captured from a plurality of camera viewpoints. The source images are derived from viewpoint associated video streams and are used to form the composite image. A conventional approach to the creation of composite images involves finding points that correspond in the contributing images and computing stitching homographies that relate their perspectives. This approach derives from the situation where images are collected from arbitrary positions, such as in hand held capture. There, the features for deriving each homography must come from the acquired images themselves. If the camera views share a center of projection, the features can be chosen from anywhere in the overlapping images and their homographies will be valid throughout the scene viewed. However, when they don't share a projection center, the features must be collected from a shared observation plane and the homography may only produce seamless composite images for imagery in that plane.

For the reasons outlined above, conventional systems that composite images are relegated to low-resolution implementations that employ a limited number of viewpoints. The limited number of viewpoints provides a limited capacity to produce panoramas from acquired images that have high spatial resolution. The performance of conventional systems is further limited by their reliance on the use of overlapping image data to generate homographies. The requirement that the source images used to compose a composite image overlap decreases the size of the view angle that can be imaged as it prevents the imaging of non-overlapping views that can cover a wider measure of space.

One skilled in the art will appreciate that the quality of such a composite image will depend on various factors including the separation between the imagers, their focal lengths, and the distance of observed features from the shared observation plane to which the camera is "focused." A scene whose content is aligned with such plane will be smoothly mosaicked while one whose content varies from that plane will have discontinuities at those deviations, and the magnitude of those deviations will increase with increasing distance from the plane.

One familiar with the fields of image processing and computer graphics will appreciate that most scenes are not aligned with specific planes and in fact have content at arbitrary locations. If that content is aligned with some other plane, then a smooth mosaic could be obtained through registration, as will be described, with respect to that plane. On the other hand, if the content has variable depth, then it may be that no single plane would suffice for its mosaicking and a piecewise subdivision of the scene into smaller planes where the content is adequately represented as planar may provide composite images that are smoothly mosaicked.

DISCLOSURE OF THE INVENTION

A method for constructing arbitrary-plane and multi-arbitrary-plane mosaic composite images from a multi-imager is disclosed. A first homography set is generated for a multi-imager based on a first reference plane. A second homography set is then generated for the multi-imager based on a second reference plane, where the second reference plane is distinct from the first reference plane. The first homography set and the second homography set are then utilized to generate a third homography set for the multi-imager based on an arbitrary plane. In so doing, the arbitrary plane becomes repositionable with respect to a scene that the multi-imager is viewing. Multiple such arbitrary planes may be selected in constructing multi-planar mosaic composite images. Multiple such second reference planes may be presented to provide improved quality derivation of the said third homography set.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

For purposes of the following discussion the term "composite image" is intended to refer to an image that is formed from two or more acquired or captured images. Moreover, the term "mosaicking" is intended to refer to the process of creating seamless composite images. The term "source image" is intended to refer to images from which a composite image is formed. The term "imager" is intended to refer to a component of a camera system that captures images. The term "homography" is intended to refer to a mathematical object that relates the perspectives of source images. In one embodiment, these homographies are determined by constraints shared by source images and are utilized to combine those source images seamlessly.

Overview

In one embodiment, the method described herein provides arbitrary planes of image composition for a multi-imaging system. That is, the present technology allows a multi-imager to smoothly mosaic images of any object within its field of view and physical focal characteristics. For example, if the multi-imager were in a conference room, anyone watching the imagery from the multi-imager would be able to select and mosaic any particular portion of the room that was within the multi-imager's field of view. In other words, if a multi-imager mosaicking camera were to be calibrated with respect to a fixed reference plane in some location, it could be redeployed to an operational site at a very different orientation and distance from its desired plane of operation. Moreover, if the user watching the imagery chose to focus on something else, whatever they selected could be automatically smoothly mosaicked due to the ability to adjust the arbitrary plane of composition for the multi-imager to any location within the multi-imager's field of view.

In another example, if the multi-imager was facing a doorway of a building and had a view down a street, utilizing the present technology, the multi-imager would be able to provide a smoothly mosaicked image both on the door and anything that may be down the street. In so doing, the need to calibrate the multi-imager for the particular depth in question is removed since the initial calibration will provide enough control information to allow the multi-imager to be mosaicked within its field of view. Moreover, because of the initial calibration, the multi-imager will be able to select the composition plane automatically, if there is sufficient overlap information in the contributing imagers to determine range. In other words, a user may select the multi-imager to focus on the door and then may utilize a joystick or other input device to focus on other objects.

Capturing Non-Planar Scenes from a Multi-Imager

Figure 1A:
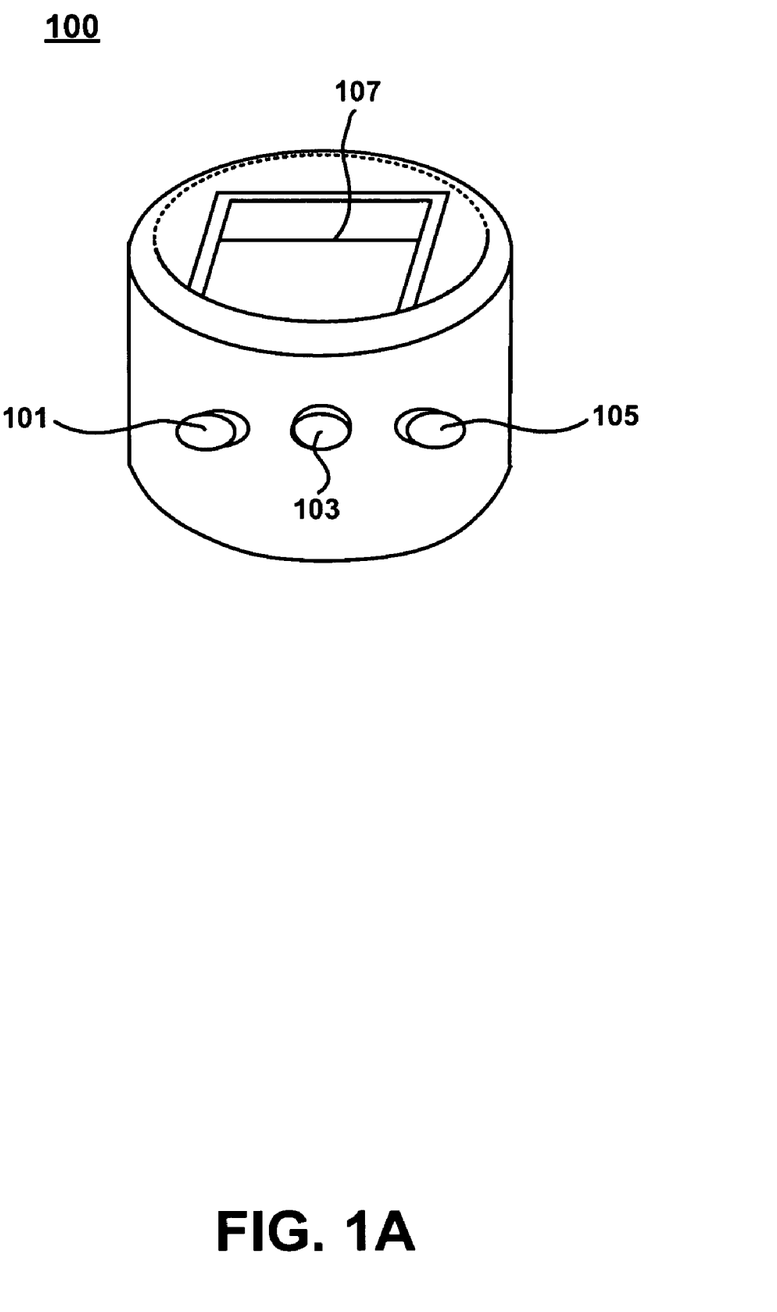
FIG. 1A shows a camera system that produces seamless composite images without requiring overlap of the source images that constitute each composite image according to one embodiment of the present invention.
Figure 1B:
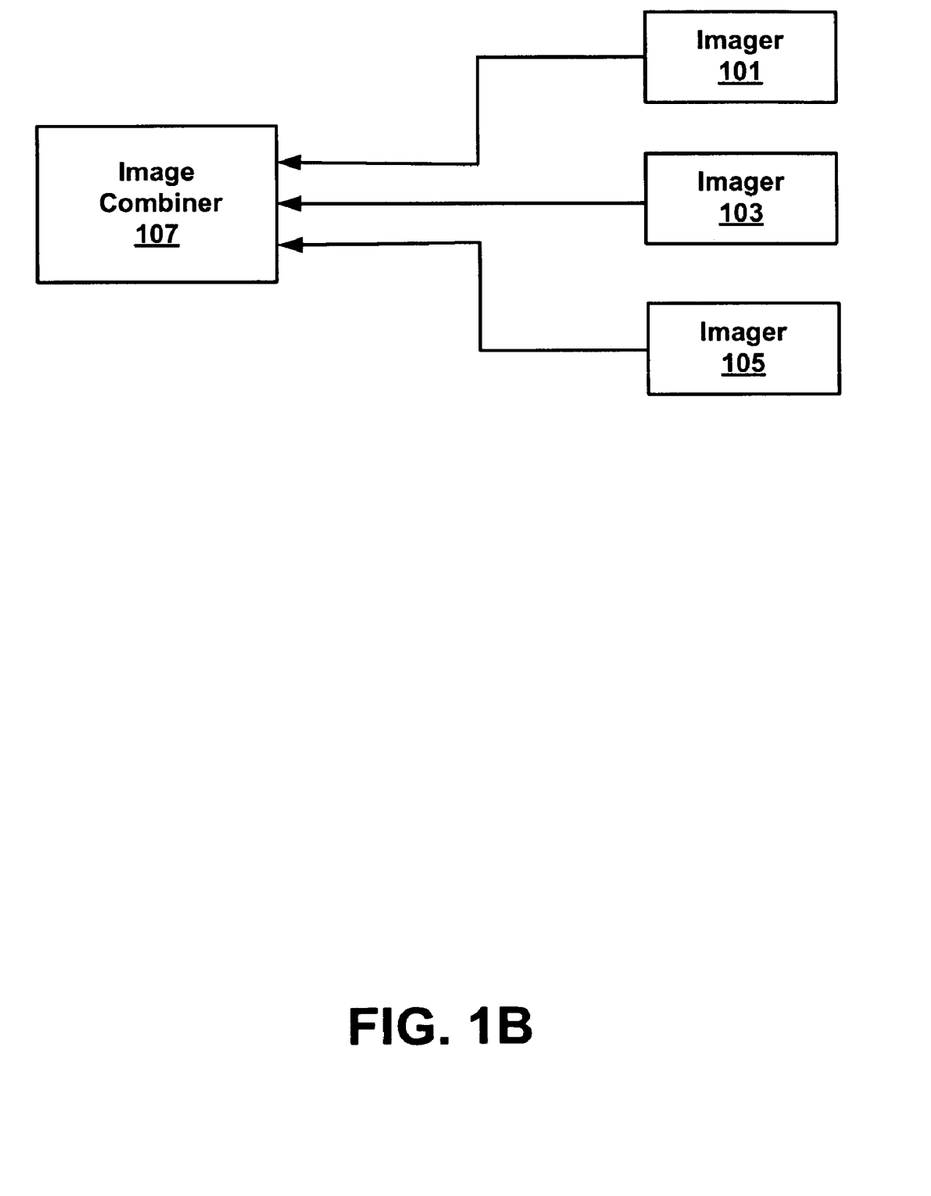
FIG. 1B shows a block diagram of a camera system that produces seamless composite images without requiring overlap of the source images that constitute each composite image according to one embodiment of the present invention.

FIG. 1A shows a multi-imager 100 that captures non-planar scenes according to one embodiment of the present invention. A block diagram 100A of multi-imager 100 is shown in FIG. 1B. In FIG. 1A, multi-imager 100 includes imagers 101-105 and image compositor 107.

Imagers 101-105 capture respective source images from the respective viewpoints of the imagers 101-105. In one embodiment, the captured source images are combined to form seamless composite images (e.g., virtual images, mosaic images etc.). The composite images are created using source images that correspond to respective image streams that are generated by the respective imagers 101-105. The composite images that are created using the captured images can yield a panoramic view that can not be derived from any of the individual views.

Although multi-imager 100 is depicted in FIG. 1 as including three imagers, other arrangements that include other numbers of imagers can be employed according to exemplary embodiments. In one embodiment imagers can be employed as a part of a pan tilt zoom (PTZ) imaging system that provides frame selection within the composite image.

Combiner 107 combines the source images that are acquired by imagers 101-105 to produce a seamless composite image (e.g., virtual image, mosaic image etc.). In one embodiment, the composite image is created in a manner that does not require overlap of an image region of the acquired image. In one embodiment, this is accomplished by using line features to combine the source images. The line features enable the combiner 107 to identify relationships that exist among the source images that can be utilized to combine the source images seamlessly.

It should be appreciated that the size of the view angle that can be imaged by multi-imager 100 is significantly increased as compared to conventional systems because it does not rely on image overlap to produce composite images. The larger view angle allows the imaging of panoramas that, for a fixed number of imagers, cover a wider measure of space. For this reason a plurality of lower resolution imagers can be used to produce panoramas that have increased spatial resolution for the number of imagers that are provided. Consequently, greater spatial resolution can be achieved with less additional bandwidth.

In one embodiment, because the presence of overlap can be limited to operations that ensure the continuity of the composite image, the presence of overlap can be minimized to zero. Moreover, because a series of source images that do not overlap can cover a wider angle than the same number of similarly formatted source images that do overlap, the number of imagers that are necessary to cover space desired to be imaged can be reduced. This feature minimizes the number of imagers that is required to construct a desired panoramic view. It should be appreciated that this maximizes both the usefulness of acquired pixels and the efficiency of the image processing (capacity to image a wider angle using fewer imagers). However, in another embodiment, the source images may be overlapped to provide an amount of depth information.

In one embodiment, the creation of seamless composite images (e.g., video mosaicking) can be employed to capture panoramic views (e.g., wide angled and unbroken views) of video conferencing participants for presentation at remote sites. In such embodiments the observations from several multi-viewpoint imagers are combined to simulate the performance of a much costlier mega-pixel video camera. The result can be reformatted to a desired panoramic view shape.

Figure 2A:
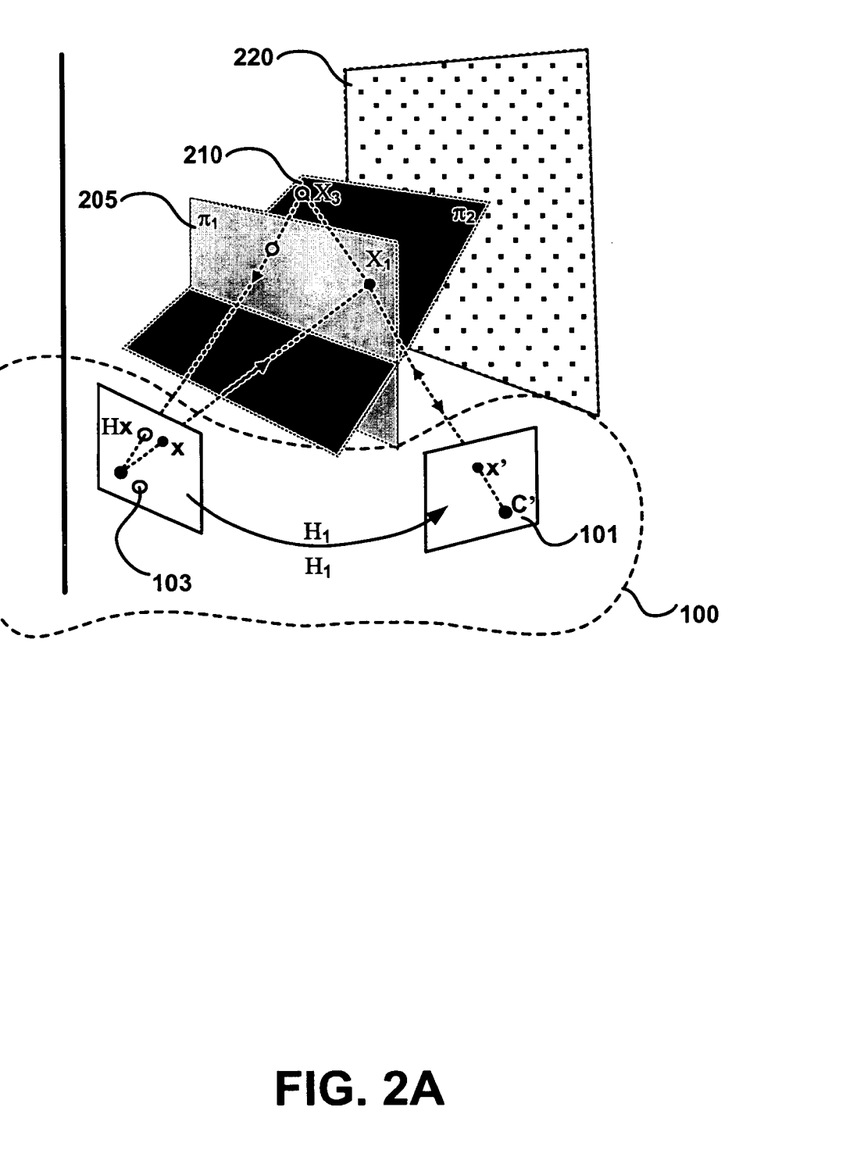
FIG. 2A is a block diagram of an exemplary redefining of a homography utilizing two rectifying homographies and a third plane according to one embodiment of the present invention.

With reference now to FIG. 2a, a block diagram 200 of an exemplary redefining of a homography utilizing two rectifying homographies and a third arbitrary plane 220 is shown in accordance with one embodiment of the present invention. In other words, multi-imager 100 is calibrated at a first plane 205. The multi-imager 100 is then moved to a new location and calibrated at a second plane 210. In one embodiment, the first plane 205 and the second plane 210 are intersecting and distinct. For purposes of brevity and clarity, diagram 200 shows the two distinct planes with the multi-imager 100 remaining in a single location. However, in one embodiment, to perform the calibration on second plane 210 multi-imager 100 is moved after being calibrated for first plane 205.

In one embodiment, the third arbitrary plane 220 is generated in the following method. Given two homographies, $H_1$ and $H_2$ relating two imagers 101 and 103 through two scene planes 205 and 210, a third homography, $H_d$ is defined. In general, $H_d$ relates the imagers 101 and 103 through an arbitrary third plane 220. For example, using the formula $$H = H_2^{-1} \cdot H_1$$

H is an homography mapping via plane 205 to plane 210 and then back to plane 205. This transform has a fixed point that is the epipole $e_a$ in imager 101, and this fixed point is an eigenvector of H. Thus, the desired arbitrary homography is $$H_d = H_1 - e_b \cdot (x,y,z),$$

Where $e_b$ is the image of $e_a$ in 210, and (x,y,z) is an expression for the desired plane 220=(a,b,c,d) with d normalized to be 1 and omitted. By using the above formula, $H_d$ (the arbitrary homography) is derived.

Figure 2B:
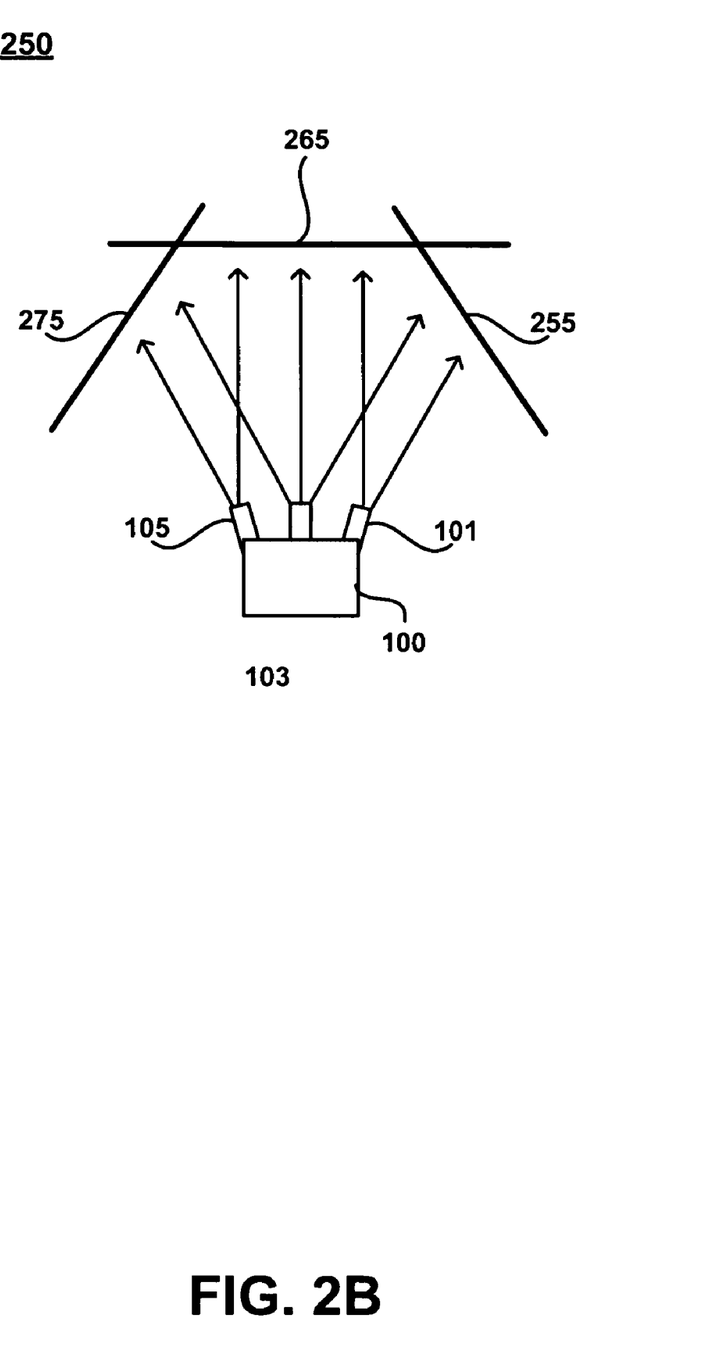
FIG. 2B is a line diagram of an exemplary piecewise-planar model in accordance with one embodiment of the present invention.

Referring now to FIG. 2B, a block diagram of an exemplary piecewise-planar model is shown in accordance with one embodiment of the present invention. In general, piecewise-planar model 250 is possible after the multi-imager 100 is calibrated based on a first plane and a second plane as described in FIG. 2A. That is, once the multi-imager 100 is calibrated, the multi-imager 100 is capable of receiving imagery for any number of arbitrary planes utilizing the pre-established arbitrary homography. For example, in 250, there is a first plane 255, a second plane 265 and a third plane 275. Furthermore, the three planes are adjoining and distinct. In one embodiment, the three planes are referred to herein as piecewise-planar model. In another embodiment, there may be any number of adjoining and distinct planes.

Basically, the piecewise-planar model 250 extends the application of the mosaic multi-imager to deep scenes. That is, for a scene that has content at variable depth, the piecewise-planar model allows the multi-imager to clearly image the scene. Moreover, because the piecewise-planar model 250 is complex, estimating the scene shape would, in a preferred embodiment, be an automated process. For example, the imagery from the multi-imager 100 may be evaluated using a stereo range computation process or a multi-view range computation. In other words, in one embodiment, the stereo range computation process could generate the piece-wise planar model for the specific scene layout, and the mosaicking subsystem could generate the appropriate homographies for the mosaic.

Figure 3:
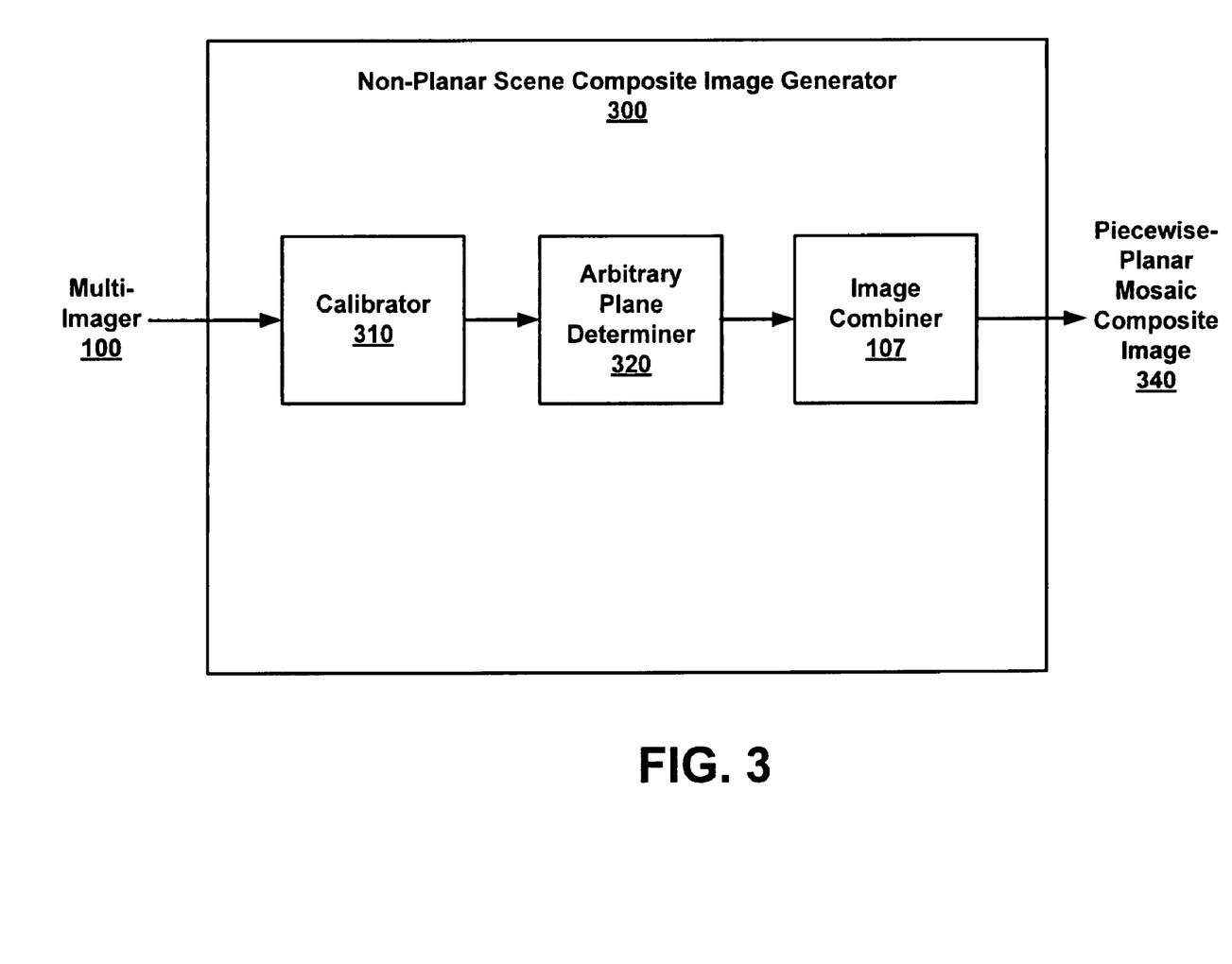
FIG. 3 is a block diagram of an exemplary non-planar scene composite image generator in accordance with one embodiment of the present invention.

With reference now to FIG. 3, a block diagram of an exemplary non-planar scene composite image generator 300 is shown in accordance with one embodiment of the present invention. In one embodiment, non-planar scene composite image generator 300 includes a calibrator 310, an arbitrary plane determiner 320 and an image combiner 107. In general, non-planar scene composite image generator 300 accesses a multi-imager 100. Non-planar scene composite image generator 300 then receives the calibration data when the multi-imager is calibrated at a first plane and a second plane as described in FIG. 2a.

The calibration data are then passed to the arbitrary plane determiner 320 which calculates the homography for the arbitrary plane. The information is then used in conjunction with the image combiner 107 to provide a piecewise planar mosaic composite image 340. Thus, non-planar scene composite image generator 300 allows a multi-imager to smoothly mosaic anything within the multi-imager's field of view and physical focal parameters regardless of the original plane distances at which the multi-imager 100 was calibrated.

Figure 4:
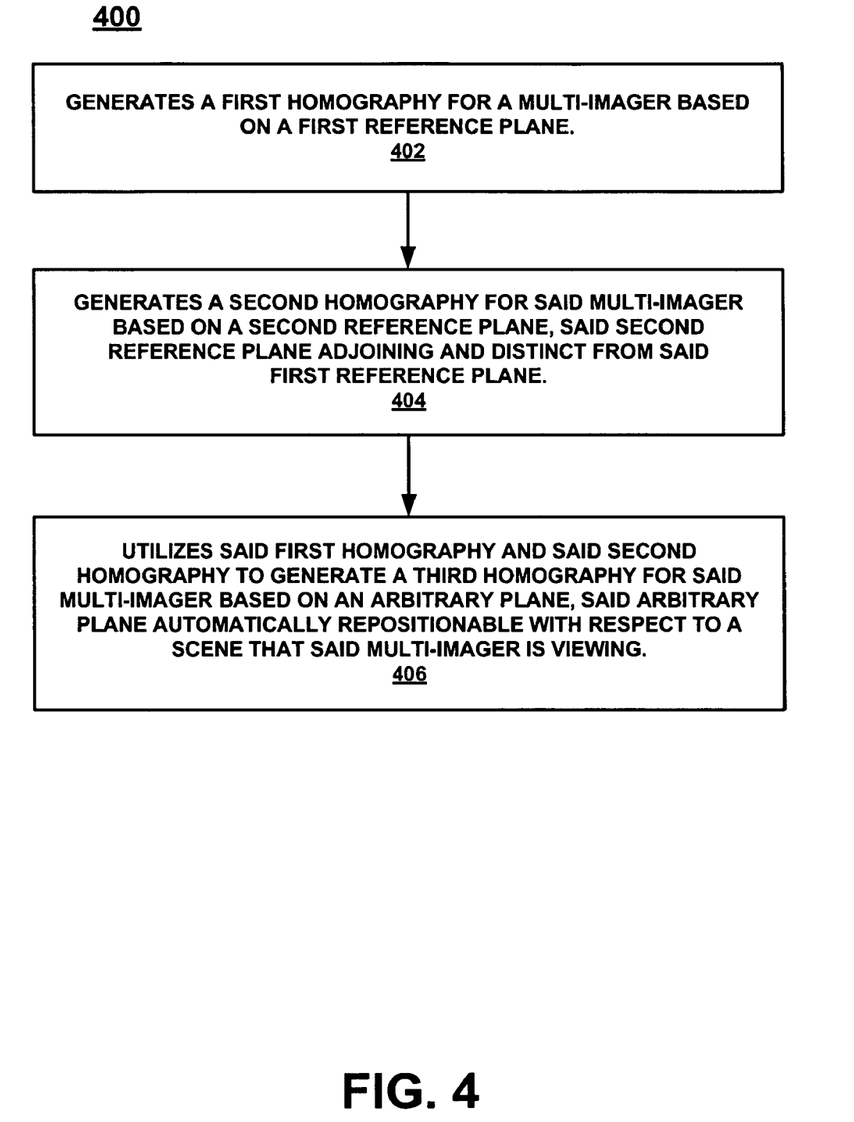
FIG. 4 is a flowchart of a method for capturing non-planar scenes from a multi-imager in accordance with one embodiment of the present invention.

With reference now to FIG. 4, a flowchart of a method for mosaicking imagery from scenes with content at variable depths from a multi-imager is shown in accordance with one embodiment of the present invention. In one embodiment, the method described herein allows a multi-imager to smoothly mosaic images of any objects within its field of view and physical focal characteristics. For example, if the multi-imager was facing a doorway of a building and had a view down a street, utilizing the present technology, the multi-imager would be able to provide a smoothly mosaicked image of both the door and anything that may be down the street. In so doing, the need to calibrate the multi-imager for the particular depths in question is removed since the initial calibration will provide enough information to allow the multi-imager to create mosaics over its field of view. In one embodiment, a user may select the multi-imager to focus on the door and then may utilize a joystick or other input device to identify other objects that it wishes to smoothly mosaic. In another embodiment, if there is sufficient overlap in the contributing imagers to determine range, the smooth mosaicking operation of the multi-imager may be derived automatically from the observed imagery.

With reference now to 402 of FIG. 4 and to FIG. 2a, one embodiment generates a first homography for a multi-imager 100 based on a first reference plane 205. That is, multi-imager 100 including a first imager 103 and a reference imager 101 is calibrated based on a first reference plane 205. In one embodiment, the homography $H_1$ for the first reference plane 205 is established using the equations provided herein.

Referring now to 404 of FIG. 4 and to FIG. 2a, one embodiment generates a second homography for the multi-imager 100 based on a second reference plane 210, the second reference plane 210 distinct from the first reference plane 205. In other words, multi-imager 100 including first imager 103 and reference imager 101 are moved to a new location and calibrated based on a second reference plane 210 which is distinct from the first reference plane 205. In one embodiment, the homography $H_2$ for the second reference plane 210 is also established using the equations the method employed for the first plane.

With reference now to 406 of FIG. 4 and to FIG. 2a, one embodiment utilizes the first homography and the second homography to generate a third homography for the multi-imager based on an arbitrary plane 220. In so doing, the arbitrary plane 220 is repositionable with respect to a scene that the multi-imager is viewing (e.g., 250 of FIG. 2b). For repositioning this third plane, it is useful to know the pose of the first and/or second planes. These may be determined through a decomposition of the homographies $H_1$ and $H_2$ into their rotation and displacement components, as one skilled in the art would appreciate. In one embodiment, the arbitrary plane 220 is partitioned into a plurality of distinct but adjoining planes such as planes 255, 265 and 275 of FIG. 2b. In one embodiment, the angle of the plurality of distinct but adjoining planes is offset. For example, the offset angle of the plurality of distinct but adjoining planes is illustrated in the piecewise-planar mosaicking planes 255, 265 and 275.

Referring now to 408 of FIG. 4 and to FIG. 2a, one embodiment utilizes said third homography set to compose a seamless smoothly mosaicked image comprising images acquired by the multi-imager camera. In other words, after the arbitrary plane 220 is established, the present technology then acquires a plurality of source images from the multi-imager and combines them to produce a seamless mosaicked composite image. For example, in one embodiment, multi-view range computation is utilized on any overlapping image content from the plurality of source images (e.g., 255-275) to generate three-dimensional imaging information for the composite image when the arbitrary plane 220 is partitioned into a plurality of distinct but adjoining planes.

However, in another embodiment, stereo range computation of any overlapping image content from the plurality of non-planar source images is utilized to generate three-dimensional imaging information for the composite image when the arbitrary plane 220 is partitioned into a plurality of distinct but adjoining planes. In yet another embodiment, any type of three-dimensional range computation is utilized to generate three-dimensional imaging information for the composite image.

Producing Seamless Composite Images

The Use of Line Features

It should be appreciated that the size of the view angle that can be imaged by multi-imager 100, of FIG. 1, employing the above described line feature image compositing methodology is significantly increased as compared to conventional systems because image overlap is not required in order to produce seamless composite images. The larger view angle allows the imaging of panoramas that cover a wider measure of space. For this reason, by employing the herein described methodology, a plurality of lower resolution imagers can be used to produce panoramas that have increased spatial resolution for the number of imagers that are provided. Consequently, greater spatial resolution can be achieved with less additional bandwidth.

Line Based Homographies

Figure 5A:
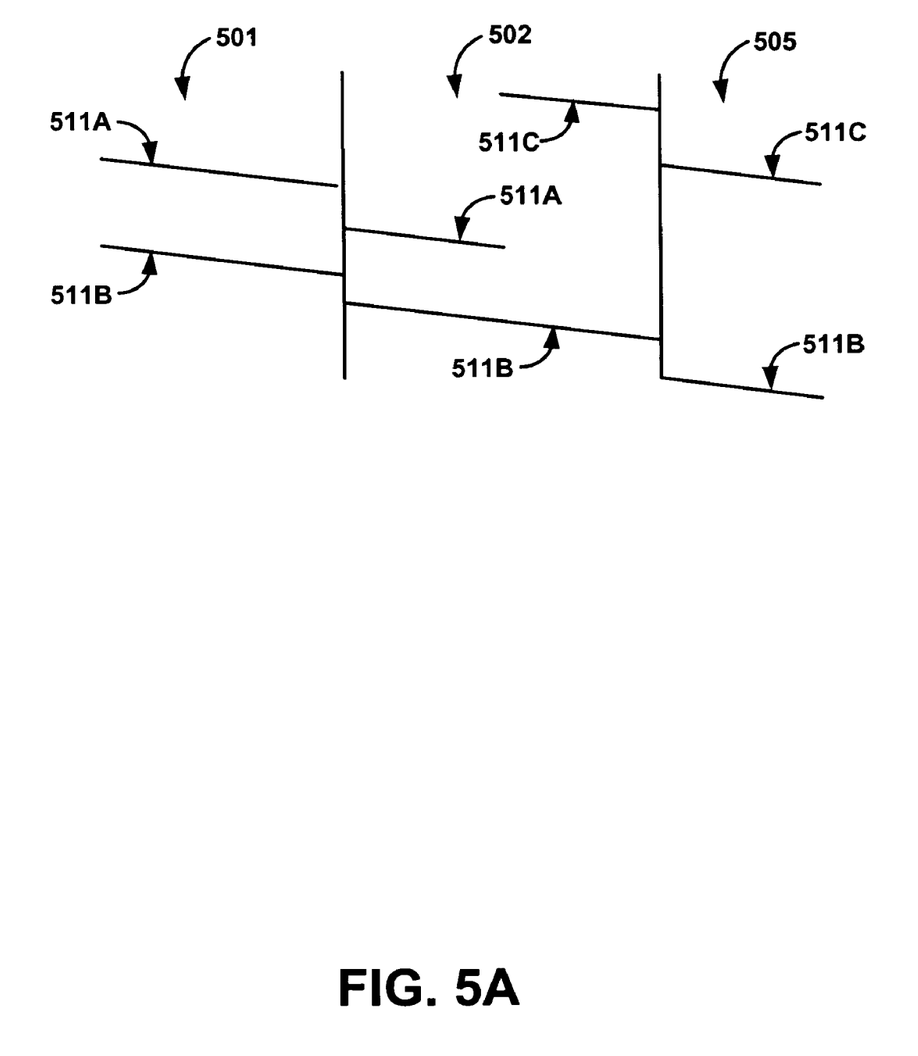
FIG. 5A illustrates the formation of a seamless composite image using line based homographies according to one embodiment of the present invention.
Figure 5B:
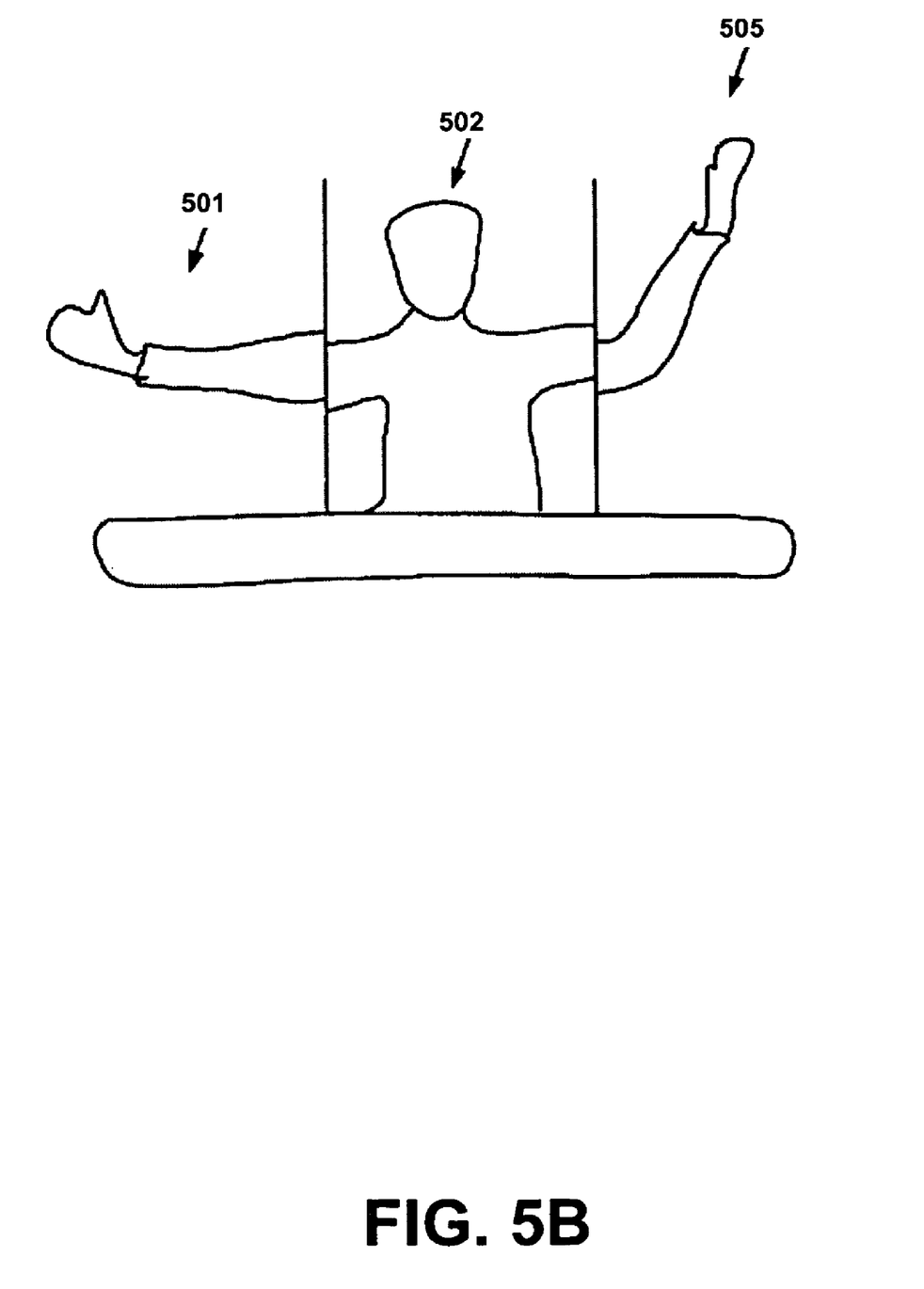
FIG. 5B illustrates the formation of a seamless composite image using line based homographies according to one embodiment of the present invention.
Figure 5C:
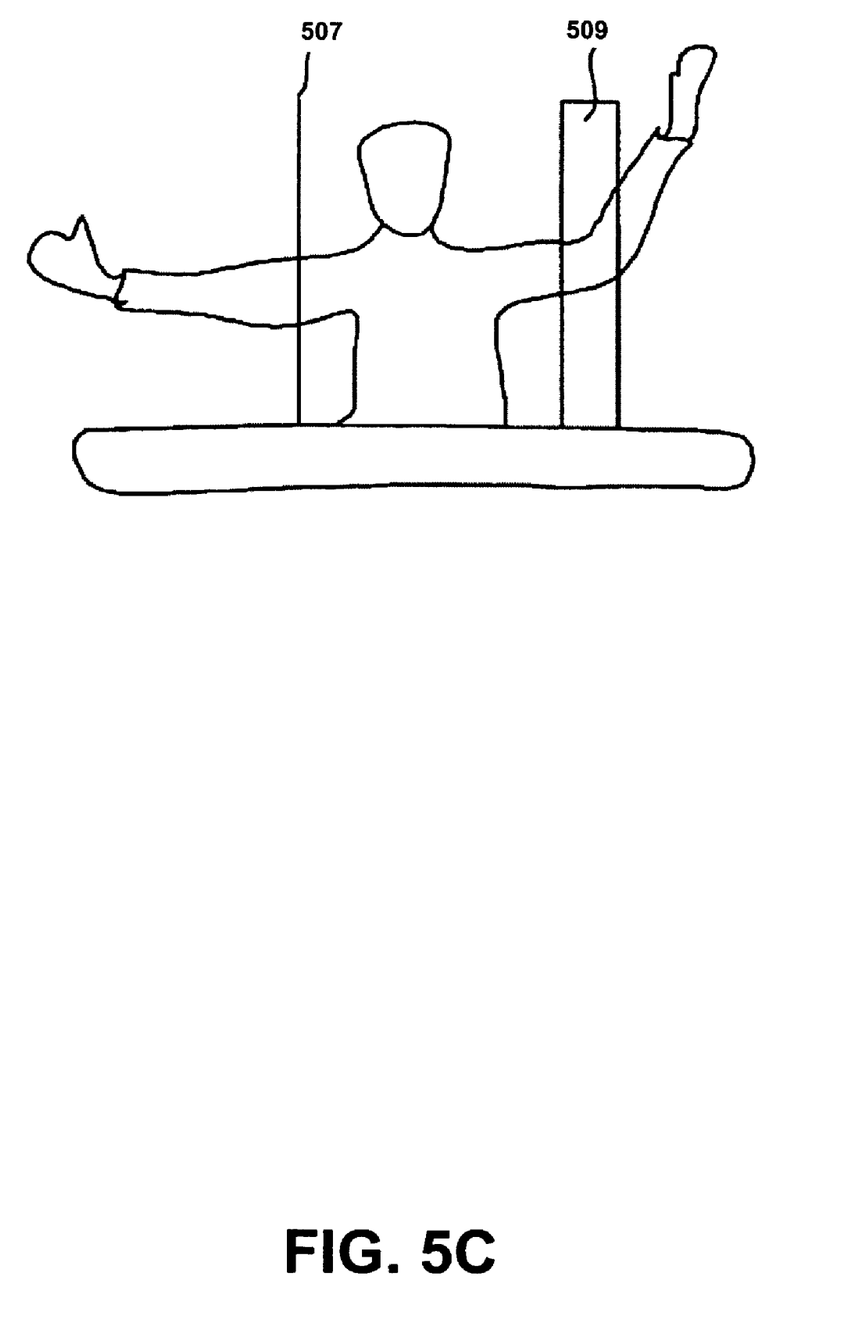
FIG. 5C illustrates the formation of a seamless composite image using line based homographies according to one embodiment of the present invention.
Figure 5D:
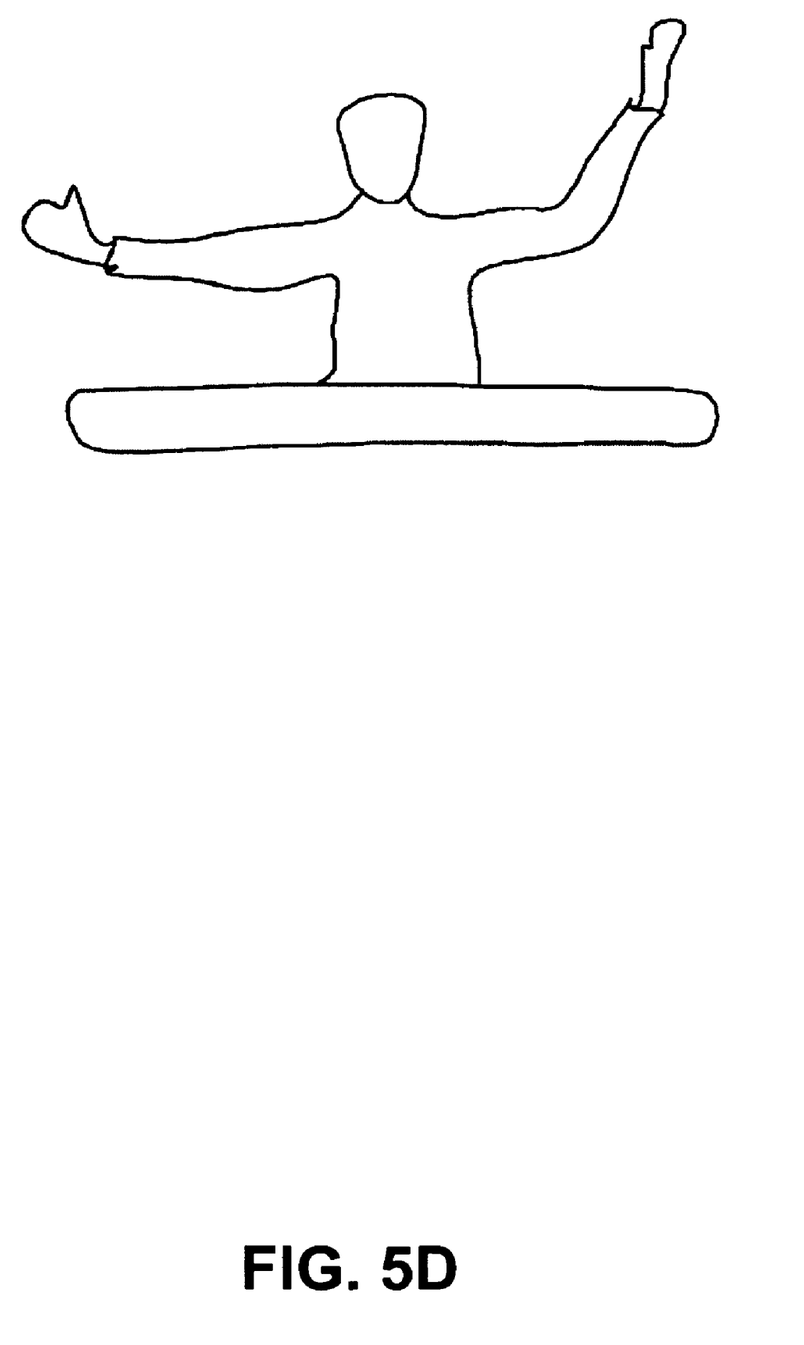
FIG. 5D illustrates the formation of a seamless composite image using line based homographies according to one embodiment of the present invention.

FIGS. 5A-5D illustrate the formation of a seamless composite image using line based homographies according to one embodiment of the present invention. FIG. 5B shows source images 501, 503 and 505 that contribute to the desired seamless composite image 340 (e.g., mosaic) shown in FIG. 5D and the line features 511 (shown in FIG. 5A as line features 511A-511C) that relate the perspectives of source images 501, 503 and 505 from which homographies of source images 501, 503 and 505 are computed. FIG. 5C shows a view of the composite image without blending (unblended regions 507 and 509 are shown in FIG. 5B).

In one embodiment, homographies can be generated by: (1) projecting line features that are detectable by an imager array, (2) correcting the line features for lens distortion, (3) estimating line features using a least squares fitter, and (4) passing the line features to a homography solver. The homography from one imager (e.g., 101-105 in FIG. 1) to another can be derived as the transpose inverse of the solution determined by treating the homogeneous representation of each line as if it were a point and solving for the point-wise homography.

It should be appreciated that in one embodiment lens correction and luminance and color adjustments are made to bring images into agreement on color and, brightness, and to correct for lens distortions. In such embodiments the geometric correction is part of the re-sampling, and the color and brightness corrections make the content photometrically more correct.

Alternately, the line based homography can be determined directly from the linear estimates. In one embodiment, having the homographies that relate one imager to another, allow the homographies to be chained together to determine the transforms that bring any involved imager into a global frame of reference. Initially, the global frame may be chosen as one of the imager frames (for instance the center imager). Subsequently, a derived global frame may be constructed that encompasses them all.

In one embodiment, a re-sampling mechanism (e.g., lookup table etc.) that contains pre-computed values that are used to compose a composite image from its contributing components is constructed after an output size within the dataset corresponding to a constructed frame is determined. The table can carry bilinear interpolation indices and weights that are used to compose each destination pixel. These indices map pixels that make up the resultant composite image through each imager homography and reposition the mapped point to account for any observed lens-induced curvatures. In one embodiment, the vast majority of pixels can be seen by only one imager. In cases where several imagers see a pixel, the contributions of the pixels can be blended. In one embodiment, the metric employed is linear interpolation (regions of overlap are determined, and the pixel weights of the contributing pixels seen by respective imagers are computed by distance from that source image's boundary).

CPU and GPU Based of Production of Seamless Composite Images

CPU Based Production of Seamless Composite Images

Figure 6:
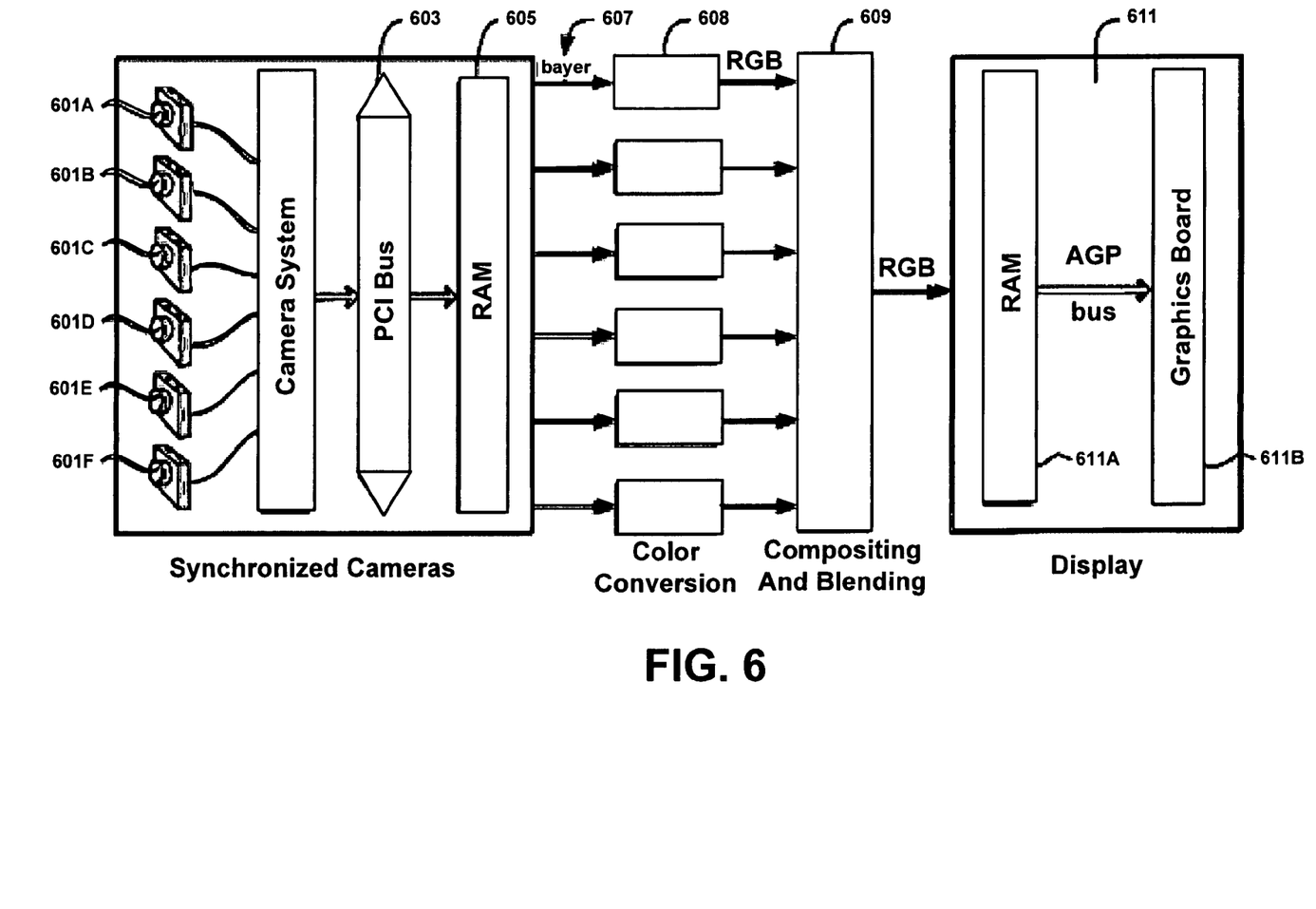
FIG. 6 shows an exemplary dataflow diagram illustrating the flow of video data where six video imagers are employed in a multi-imager camera system that employs central processing unit (CPU) processing according to one embodiment of the present invention.

FIG. 6 shows an exemplary dataflow diagram illustrating the flow of video data where six video imagers are employed in a multi-imager camera system that employs CPU processing according to one embodiment of the present invention. FIG. 6 illustrates a beneficial bandwidth and computation distribution scheme where parallelized CPU processing is employed. In the FIG. 6 embodiment, synchronized imagers 601A-601F generate parallel streams of video data that are delivered to RAM storage units 605 via a bus 603 (e.g., PCI etc.). Subsequently, the digital video 607 receives parallelized color conversion 608 and compositing and blending (if necessary) 609 and is delivered to a display 611 that includes RAM storage units 611A and graphics board 611B.

In moving large amounts of digital video 607 current PC architectures are severely taxed. Real-time display of these data requires a judicious mix across peripheral component interconnect (PCI), PCI-X, and accelerated graphics port (AGP) buses distributed over multiple display cards, which present significant bandwidth challenges. In one embodiment, with these bandwidth issues in mind, a distributed parallelized processing scheme such as is illustrated in FIG. 6 can be employed that is enabled both by the multi-imager system performance exhibited by exemplary embodiments of the present invention and by the advanced graphics processing units (GPUs) that are available for modern PCs.

In one embodiment, the compositing of images can be performed by a PC processor that uses a re-sampling mechanism (e.g., lookup-table etc). As discussed above, computation can be parallelized to exploit multiple processors. In this embodiment, re-mapping can be designed to scale based on numbers of camera pixels and size of display.

GPU Based Production of Seamless Composite Images

Figure 7:
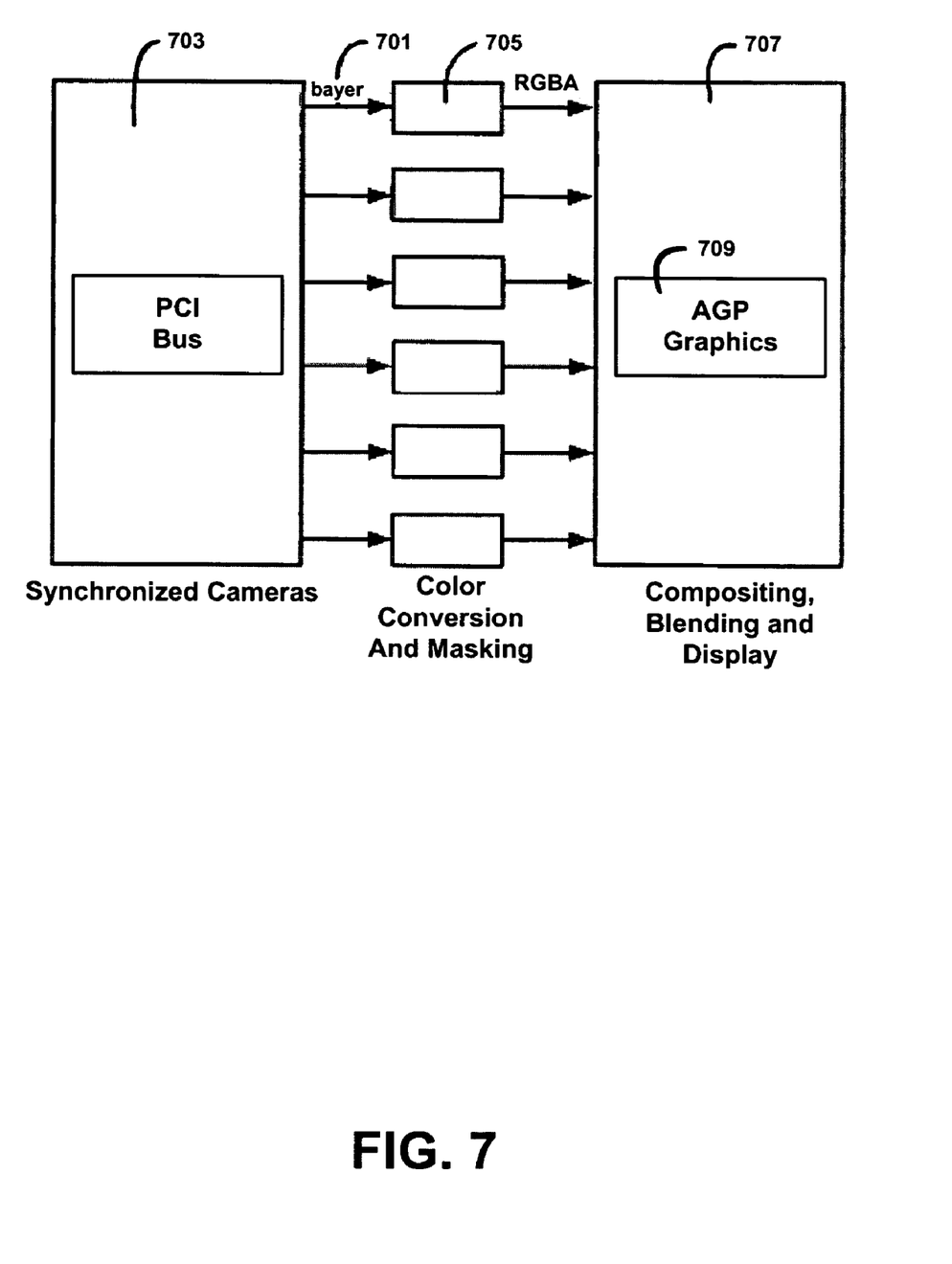
FIG. 7 illustrates an application of graphics acceleration according to one embodiment of the present invention.

FIG. 7 illustrates an application of graphics acceleration according to one embodiment of the present invention. FIG. 7 shows blocks that represent the video streams 701, which are generated by synchronized imagers, a data bus 703, color conversion operations 705, compositing/blending operations 707 and AGP graphics hardware 709. FIG. 7 illustrates an embodiment where compositing and blending operations 705 (e.g., mosaicking operations) are performed by the AGP graphics hardware 709 and preceded by CPU color conversion operations 705.

In the FIG. 7 embodiment, the use of graphics processing can be exploited for use in panorama building. In this embodiment, for display oriented tasks, re-sampling vectors can be treated as static image geometry and the streaming video can be treated as dynamic textures. In such embodiments, the static image geometry can be downloaded (reshaping the source images), allowing compositing and blending operations to be performed by the AGP graphics hardware 709 (e.g., GPU hardware). The subsequent video is streamed to the display.

In the FIG. 7 embodiment, GPU "mosaicking" can be performed considerably faster than CPU "mosaicking." In such embodiments, the CPU's task can be solely one of color converting the camera video from one format to another, and then passing the imagery to the graphics card. In another embodiment the processor load can be reduced even further by performing color re-sampling in the GPU rather than converting video into RGB before sending it to the graphics board. In this embodiment, bus bandwidth load can also be reduced which is an important consideration when cameras and displays share resources with other activities.

Another advantage of the GPU approach to "mosaicking" is that the cost of producing the composite image is independent of its size. By contrast, high costs are incurred for large images when CPU-based compositing is employed. In one embodiment, if the video stream is sent to a handheld device or ramped up for a very large display surface, the different scalings can be handled transparently in the graphics card.

In one embodiment, the graphics processing units (GPUs) of a PC can be used for the re-sampling to provide better scaling. In this embodiment, a beneficial computational use of available graphics processing is made. It should be appreciated that the use of graphics processing can be useful in display oriented applications.

Figure 8:
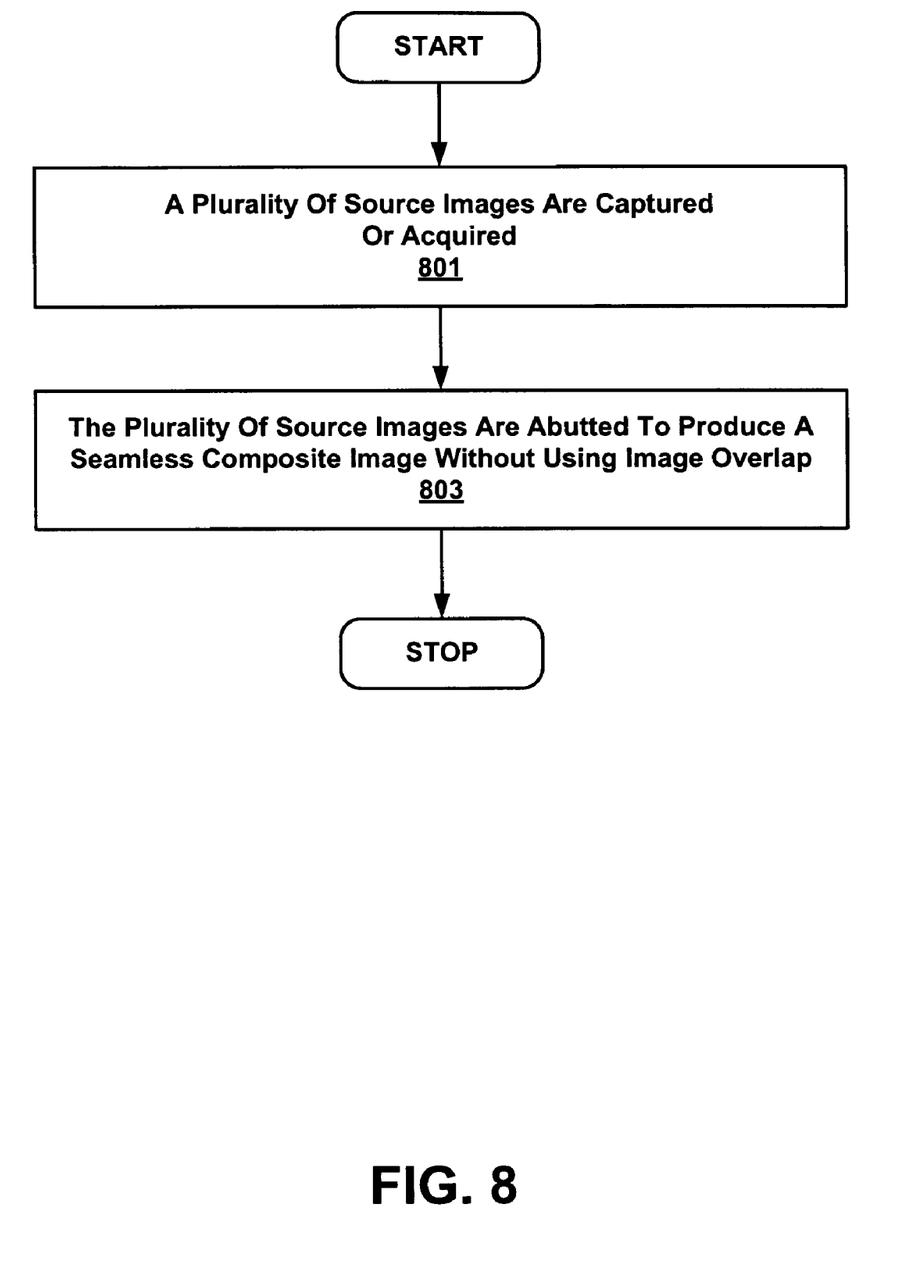
FIG. 8 shows a flowchart of the steps performed in a method of producing seamless composite images without using overlap of source images according to one embodiment of the present invention.

FIG. 8 shows a flowchart of the steps performed in a method of producing seamless composite images without using overlap of source images according to one embodiment of the present invention.

At 801, a plurality of source images is acquired (e.g., captured, imaged etc.).

At 803, the plurality of source images is combined to produce a seamless composite image. In one embodiment, the combining of the plurality of source images to produce a seamless composite image is performed without requiring overlap of image regions of the plurality of source images.

It should be appreciated that by employing the methodology described with reference to FIG. 8 the size of the view angle that can be imaged is significantly increased as compared to conventional systems because the methodology of FIG. 8 does not rely on image overlap to produce composite images. The larger view angle allows the imaging of panoramas that cover a wider measure of space. For this reason a plurality of lower resolution imagers can be used to produce panoramas that have increased spatial resolution for the number of imagers that are employed. Consequently, greater spatial resolution can be achieved with less additional bandwidth.

Thus, embodiments of the present invention provide an automated method and system for constructing, with a multi-imager, smoothly mosaicked images of scenes with content at various depths. Embodiments further provide capturing non-planar scenes with a multi-imager wherein the deployment site of the multi-imager is not within the geometry for which the multi-imager was calibrated. Embodiments also provide capturing non-planar scenes with a multi-imager that results in operation free of blur and double image artifacts. Embodiments further permit the multi-imager to accommodate to scenes with varied geometries, such as, having fronto-parallel surfaces (such as the space occupied by a person) scattered at different locations throughout the multi-imager's field of view.

Embodiments of the present invention are thus described. While the present invention has been described in particular embodiments, it should be appreciated that the present invention should not be construed as limited by such embodiments, but rather construed according to the following claims.

What is claimed is:

1. A computer implemented method for constructing smooth mosaicked images of scenes with content at various depths from a multi-imager camera, comprising:
   generating a first homography set for said multi-imager camera based on a first reference plane;
   generating a second homography set for said multi-imager camera based on a second reference plane, said second reference plane adjoining and distinct from said first reference plane;
   utilizing said first homography and said second homography sets to generate a third homography set for said multi-imager camera based on an arbitrary plane, said arbitrary plane repositionable with respect to a scene that said multi-imager camera is viewing; and utilizing said third homography set to compose a seamless smoothly mosaicked image comprising images acquired by said multi-imager camera.

2. The method of claim 1 further comprising:
utilizing a plurality of reference planes and their derived homography sets to generate a "best estimate" third homography set for said arbitrary plane.

3. The method of claim 1 further comprising:
specifying said arbitrary plane as a displacement from either the first reference plane or the second reference plane.

4. The method of claim 1 further comprising:
specifying said arbitrary plane through depth analysis using images obtained from the multi-imager camera.

5. The method of claim 1 further comprising:
partitioning said arbitrary plane into a plurality of distinct but adjoining planes with a set of corresponding homographies to which a seamless multi-imager mosaicking may construct a composite image.

6. The method of claim 5 further comprising:
specifying said arbitrary planes as displacements from the first reference plane or the second reference plane.

7. The method of claim 5 further comprising:
specifying said arbitrary planes through depth analysis using images obtained from said multi-imager camera.

8. A non-planar scene composite image generator, comprising:
a calibrator for generating a first homography set for a multi-imager based on a first reference plane and a second homography set for said multi-imager based on a second reference plane, said second reference plane adjoining and distinct from said first reference plane;
an arbitrary plane determiner for utilizing said first homography and said second homography sets to automatically generate a third homography set for said multi-imager based on an arbitrary plane, said arbitrary plane repositionable with respect to a scene that said multi-imager is viewing; and
an image combiner for utilizing said third homography set to compose a seamless smoothly mosaicked image comprising images acquired by the multi-imager camera.

9. The non-planar scene composite image generator of claim 8 wherein said specifying of said arbitrary plane is provided as a displacement from either the first reference plane or the second reference plane.

10. The non-planar scene composite image generator of claim 8 wherein said specifying of said arbitrary plane is provided through depth analysis using images obtained from the multi-imager camera.

11. The non-planar scene composite image generator of claim 8 wherein said arbitrary plane determiner partitions said arbitrary plane into a plurality of distinct but adjoining planes with a set of corresponding homographies to which a seamless multi-imager mosaicking may construct a composite image.

12. The non-planar scene composite image generator of claim 11 wherein the angle of said plurality of distinct but adjoining planes is offset to form a set of piecewise-planar mosaicking reference planes.

13. The non-planar scene composite image generator of claim 12 wherein said arbitrary planes are specified as displacements from either the first reference plane or the second reference plane.

14. The non-planar scene composite image generator of claim 12 wherein said arbitrary planes are specified through depth analysis using images obtained from the multi-imager camera.

15. The non-planar scene composite image generator of claim 8 wherein at least a portion of said combining is performed using a graphics processing unit (GPU).

16. A non-transitory computer-useable medium having computer-readable program code stored thereon for causing a computer system to execute a method for constructing smooth mosaicked images of scenes with content at various depths from a multi-imager camera, comprising:
generating a first homography set for said multi-imager camera based on a first reference plane;
generating a second homography set for said multi-imager camera based on a second reference plane, said second reference plane adjoining and distinct from said first reference plane;
utilizing said first homography and said second homography sets to generate a third homography set for said multi-imager camera based on an arbitrary plane, said arbitrary plane repositionable with respect to a scene that said multi-imager camera is viewing; and
utilizing said third homography set to compose a seamless smoothly mosaicked image comprising images acquired by said multi-imager camera.

17. The non-transitory computer-useable medium having computer-readable program code stored thereon of claim 16 further comprising:
specifying said arbitrary plane from a method selected from the group including: specifying said arbitrary plane a displacement from either the first reference plane or the second reference plane and specifying said arbitrary plane through depth analysis using images obtained from said multi-imager camera.

18. The non-transitory computer-useable medium having computer-readable program code stored thereon of claim 16 further comprising:
partitioning said arbitrary plane into a plurality of distinct but adjoining planes with a set of corresponding homographies to which a seamless multi-imager mosaicking may construct a composite image.

19. The non-transitory computer-useable medium having computer-readable program code stored thereon of claim 18 further comprising:
offsetting the angle of said plurality of distinct but adjoining planes to form a set of piecewise-planar mosaicking reference planes.

20. The non-transitory computer-useable medium having computer-readable program code stored thereon of claim 16 further comprising:
specifying said arbitrary plane from a method selected from the group including: specifying said arbitrary planes as displacements from either the first reference plane or the second reference plane and specifying said arbitrary planes through depth analysis using images obtained from said multi-imager camera.

* * * * *